(12) United States Patent
Siddens

(10) Patent No.: US 9,852,476 B2
(45) Date of Patent: Dec. 26, 2017

(54) CASE MANAGEMENT INTERFACE

(71) Applicant: VISA INTERNATIONAL SERVICE ASSOCIATION, San Francisco, CA (US)

(72) Inventor: Cory H. Siddens, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 110 days.

(21) Appl. No.: 14/601,962

(22) Filed: Jan. 21, 2015

(65) Prior Publication Data

US 2015/0206146 A1 Jul. 23, 2015

Related U.S. Application Data

(60) Provisional application No. 61/929,720, filed on Jan. 21, 2014.

(51) Int. Cl.
*G06Q 20/40* (2012.01)
*G06Q 40/00* (2012.01)
*G06F 1/00* (2006.01)

(52) U.S. Cl.
CPC .............. *G06Q 40/12* (2013.12); *G06F 1/00* (2013.01)

(58) Field of Classification Search
CPC combination set(s) only.
See application file for complete search history.

(56) References Cited

U.S. PATENT DOCUMENTS

| 7,263,506 B2* | 8/2007 | Lee ........................ G06Q 20/04 705/318 |
| 8,162,125 B1* | 4/2012 | Csulits ................. G07D 7/0033 194/206 |
| 8,682,696 B1* | 3/2014 | Shanmugam .......... G06Q 10/10 705/35 |
| 2009/0044279 A1 | 2/2009 | Crawford |
| 2009/0161152 A1* | 6/2009 | Mori ................. G06F 17/30011 358/1.15 |
| 2010/0138243 A1* | 6/2010 | Carroll ................... G06Q 40/08 705/4 |

OTHER PUBLICATIONS

Clearly and Simply Intelligent Data Analysis, Modeling, Simulation and Visualization, Build Network Graphs in Tableau, Dec. 11, 2012, 19 pages, http://www.clearlyandsimply.com/clearly_and_simply/2012/12/build-network-graphs-in-tableau.html.

(Continued)

*Primary Examiner* — Luna Champagne
(74) *Attorney, Agent, or Firm* — Kilpatrick Townsend & Stockton LLP

(57) ABSTRACT

Case management interface provides correlation among a plurality of transaction orders in an interactive graphical format. A visualization window displays a plurality of transaction orders that are visually connected based on one or more common data elements associated with the transaction orders. The visualization window can allow a user to interact with different elements of the display to analyze the relationship between order data elements, view order details, reject or accept orders or mark an order as suspect. Different layout options are available to enhance the visualization of the transaction order data.

20 Claims, 15 Drawing Sheets

(56) References Cited

OTHER PUBLICATIONS

Oughton, Force Directed Emails Visualisation Using arbor.js, May 4, 2011, 4 pages, http://joeloughton.com/blog/web-applications/force-directed-emails-visualisation-using-arbor-js/.
Use Linkurious to Fight Fraud, Blogs posts of Apr. to Aug. 2014, 7 pages, http://linkurio.us/use-linkurious-fight-fraud.
Cambridge Intelligence, Combating Faud Using Graph Databases and Graph Visualization, Apr. 25, 2013, 2 pages, http://vimeo.com/64827612.

* cited by examiner

FIG. 6

CASE MANAGEMENT INTERFACE

CROSS-REFERENCES TO RELATED APPLICATIONS

The present application claims priority from and is a non-provisional application of U.S. Provisional Application No. 61/929,720, entitled "Case Management Interface" filed Jan. 21, 2014, the entire contents of which are herein incorporated by reference for all purposes.

BACKGROUND

Generally, online transactions go through fraud detection as part of the payment flow to identify transactions that are clearly acceptable or clearly fraudulent. Some transactions may be subjected to a review by a human reviewer if they are not clearly fraudulent or clearly acceptable. Reviewers may need to go through a long list of transactions in a review queue in order to determine if a transaction under consideration is related to any previous transactions. Since transaction data for each transaction may involve a number of data elements, it can be a time consuming and inefficient task to find correlations among different transactions, especially if there are hundreds of transactions for review.

Embodiments of the invention address these and other problems, individually and collectively.

SUMMARY

Embodiments of the invention provide an interactive graphical interface to display correlation among a plurality of transaction orders. A visualization window can display a plurality of transaction orders that are visually connected based on one or more common data elements associated with the transaction orders. The visualization window can allow a user to interact with different elements of the display, e.g., to analyze the relationship between order data elements, view order details, reject or accept orders, or mark an order as suspect. Different layout options are available to enhance the visualization of the transaction order data.

According to one embodiment of the invention, a request is received for visualization of a plurality of transaction orders, e.g., by selecting certain transaction orders. Transaction data associated with the plurality of transaction orders can be obtained from a database, where each transaction order is composed of data elements. A set of the transaction orders can be determined as being correlated based on one or more common data elements in the transaction data associated with the set of the transaction orders. The set of the transaction orders can be displayed on a display screen as being correlated by showing data objects that correspond to the data elements of the transaction orders and that are visually connected. A selection of one or more transaction orders in the plurality of transaction orders can be received via a pointing device on the display screen. A menu with a plurality of options for the selected one or more transaction orders can be provided, and a selection of an option from the plurality of options can be received. Actions can be performed on the transaction order based on a selected option.

Embodiments of the invention are further directed to a computer comprising a processor, a display screen, a database storing transaction data associated with transaction orders, and a computer readable medium coupled to the processor. The computer readable medium can comprise code executable by the processor for implementing any of the methods described herein.

These and other embodiments of the invention are described in further detail below.

BRIEF DESCRIPTION OF THE DRAWINGS

FIG. 6 shows case details displayed in response to selecting a menu option according to embodiments of the present invention.

DETAILED DESCRIPTION

Figure 1:
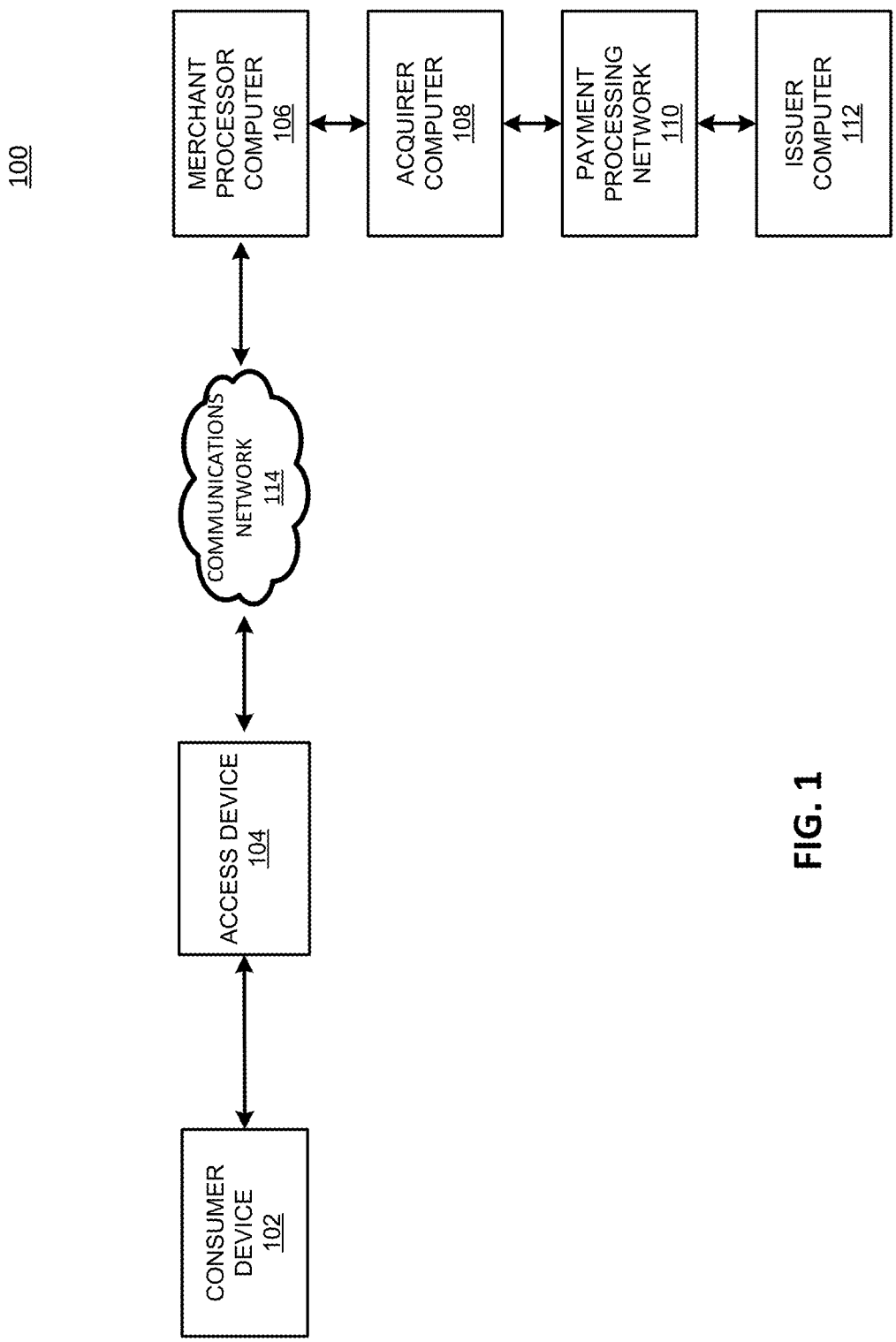
FIG. 1 illustrates an exemplary system according to embodiments of the present invention.

Generally, financial transactions go through a fraud detection system to differentiate fraudulent transactions from non-fraudulent transactions. Transactions that are clearly non-fraudulent may be approved. Transactions that are clearly fraudulent may be rejected. Some transactions may need further review before they can be approved or rejected. Such transactions may be sent to a review queue where manual reviewers may evaluate the transaction based on the current transaction data and any historical transaction data associated with the transaction.

Reviewers going through a plurality of transaction orders in a review queue may identify transactions that are linked together based on one or more data elements. For example, transactions may be linked if they are conducted by a repeat consumer at a particular merchant since they may share the same account number, shipping address, email address, device fingerprint, IP address, etc. Transaction orders may comprise other data elements that may identify a transaction, such as a consumer name and an account identifier (e.g., payment account number, token number, digital wallet identifier, etc.).

However, a fraudster trying to use an unauthorized payment account may not share the same data elements in most cases. For example, the fraudster may use a different shipping address or a different email address than the ones used in the past for the same payment account number by the authorized consumer. To determine a correlation among a plurality of transaction orders may be a time consuming task for a reviewer as some transactions may share the same email address, while some other transactions may share the same IP address, and so on. Consequently, the reviewer may have to perform multiple searches to find transactions that may be correlated based on the same email address, same payment account number or the same shipping address. Additionally, if a transaction is marked as suspect in the review queue, the reviewer may have to find other transactions in the queue that may be linked to the suspected transaction and individually mark those transactions as rejected or fraudulent.

Embodiments of the invention provide a graphical user interface to represent correlation among a plurality of transaction orders. In some embodiments, a correlation among a set of transaction orders may be determined based on one or more common data elements in the transaction data associated with the set of the transaction orders. For example, the one or more common data elements may variously include a payment account number, a shipping address, an email address, a device fingerprint, an IP address, etc. The correlation between the set of transaction orders may be shown on a display screen using data objects that correspond to the data elements of the transaction orders and that are visually connected. The reviewer may select one or more transaction orders to take certain actions on the selected transaction orders using a pointing device on the display screen such as a mouse or a touch screen. For example, the reviewer can review a transaction order and mark a transaction order as accept, reject, or as a suspect.

I. System

A. Example Architecture

FIG. 1 illustrates an exemplary system 100 with at least some of the components for implementing embodiments of the invention.

A consumer can initiate a transaction at an access device 104 using a consumer device 102. A consumer device may refer to any device that may be used to conduct a financial transaction, such as to provide payment information to a merchant. The consumer device 102 may be in any suitable form. Some non-limiting examples of the consumer device 102 may include mobile devices (e.g., cellular phones, keychain devices, personal digital assistants (PDAs), pagers, notebooks, laptops, notepads, etc.), personal computers, payment cards (e.g., smart cards, magnetic stripe cards, etc.), and the like. In some embodiments, the consumer device 102 may also be configured to communicate with one or more cellular networks.

The consumer device 102 may be associated with a payment account identifier. For example, the payment account identifier may be a payment account number (e.g., a credit card number) or a digital wallet identifier. In some embodiments, a device fingerprint may be associated with the consumer device 102. For example, the device fingerprint may include information about a device and/or a consumer to fully or partially identify the device and/or the consumer. In some implementations, the device fingerprint is created by taking a hash of information unique to the device and generating an alphanumeric string.

An access device may be any suitable device for communicating with a merchant computer or a payment processing network, and for interacting with a payment device, a consumer's computer apparatus, and/or a consumer's mobile device. Some non-limiting examples of the access device 104 may include point-of-sale (POS) devices, cellular phones (e.g., mPOS), PDAs, personal computers (PCs), tablet PCs, set-top boxes, virtual cash registers (VCRs) and the like. The access device 104 may use any suitable contact or contactless mode of operation to send or receive data from, or associated with, the consumer payment device 102. In some embodiments, the access device 104 may be a client computer associated with a merchant.

A merchant processor computer 106 may be configured to receive transaction data from the access device 104 associated with a merchant via a communications network 114. The communications network 114 may comprise a plurality of networks for secure communication of data and information between different merchants and the merchant processor computer 106. In some embodiments, the communications network 114 may follow a suitable communication protocol to generate one or more secure communication channels between the merchant processor computer 106 and the access device 104. Any suitable communications protocol may be used for generating a communications channel. A communication channel may in some instance comprise a "secure communication channel," which may be established in any known manner, including the use of mutual authentication and a session key and establishment of an SSL session. However, any method of creating a secure channel may be used. By establishing a secure channel, sensitive information related to a payment device (such as account number, CVV values, expiration dates, etc.) may be securely transmitted between the access device 104 and the merchant processor computer 106 to facilitate a transaction.

The merchant processor computer 106 may receive the transaction data for a transaction order and apply a set of rules to determine if the transaction is clearly fraudulent, clearly not fraudulent, or indeterminate and requires further review. For example, a fraud management system (e.g., "Decision Manager" from CyberSource®, Inc.) may provide fraud detection capability for online transactions. Such a system may allow a reviewer to search multiple transactions based on various search parameters, for example, transactions conducted in the last month, transactions with amounts over $100, transactions originated in a certain zip code or country, transactions at a certain merchant and so on.

As part of the fraud detection, transactions which are clearly fraudulent may be rejected. The transactions which are clearly not fraudulent may be approved. The transaction orders which require further review may be sent to a review queue where a human reviewer may further evaluate the transaction order to determine if the transaction can be approved or rejected based on the transaction data. If the transaction is approved, the merchant processor computer 106 may generate and/or transmit an authorization request message to an issuer computer 112 via a payment processing network 110 and an acquirer computer 108.

In some embodiments, the merchant processor computer 106 may be communicatively coupled to a transaction history database that may be embodied by a memory. The transaction history database may store transaction data associated with a plurality of transaction orders over a period of time. The merchant processor computer 106 may access the transaction data and generate an interactive visualization that displays a plurality of transaction orders that are visually connected based on one or more common data elements.

The visualization may enable a reviewer to detect fraud and carry out actions on transactions orders based on the detected fraud.

The acquirer computer 108 is typically a system for an entity (e.g., a bank) that has a business relationship with a particular merchant or other entity. The acquirer computer 108 may route the authorization request for a transaction to the issuer computer 112 via the payment processing network 110.

The payment processing network 110 may include data processing subsystems, networks, and operations used to support and deliver authorization services, and clearing and settlement services. An example of payment processing network 110 includes VisaNet®, operated by Visa®. The payment processing network 110 may include wired or wireless network, including the internet.

The issuer computer 112 is typically a computer run by a business entity (e.g., a bank) that may have issued the payment (credit/debit) card, account numbers or payment tokens used for the transactions. Some systems can perform both issuer computer 112 and acquirer computer 108 functions. When a transaction involves a payment account associated with the issuer computer 112, the issuer computer 112 may verify the account and respond with an authorization response message to the acquirer computer 108 that may be forwarded to the corresponding access device and the consumer device if applicable.

At a later time (e.g., at the end of the day), a clearing and settlement process can occur between the acquirer computer 108, the payment processing network 110, and the issuer computer 112.

B. Collection and Storage of Historical Transaction Data

Figure 2:
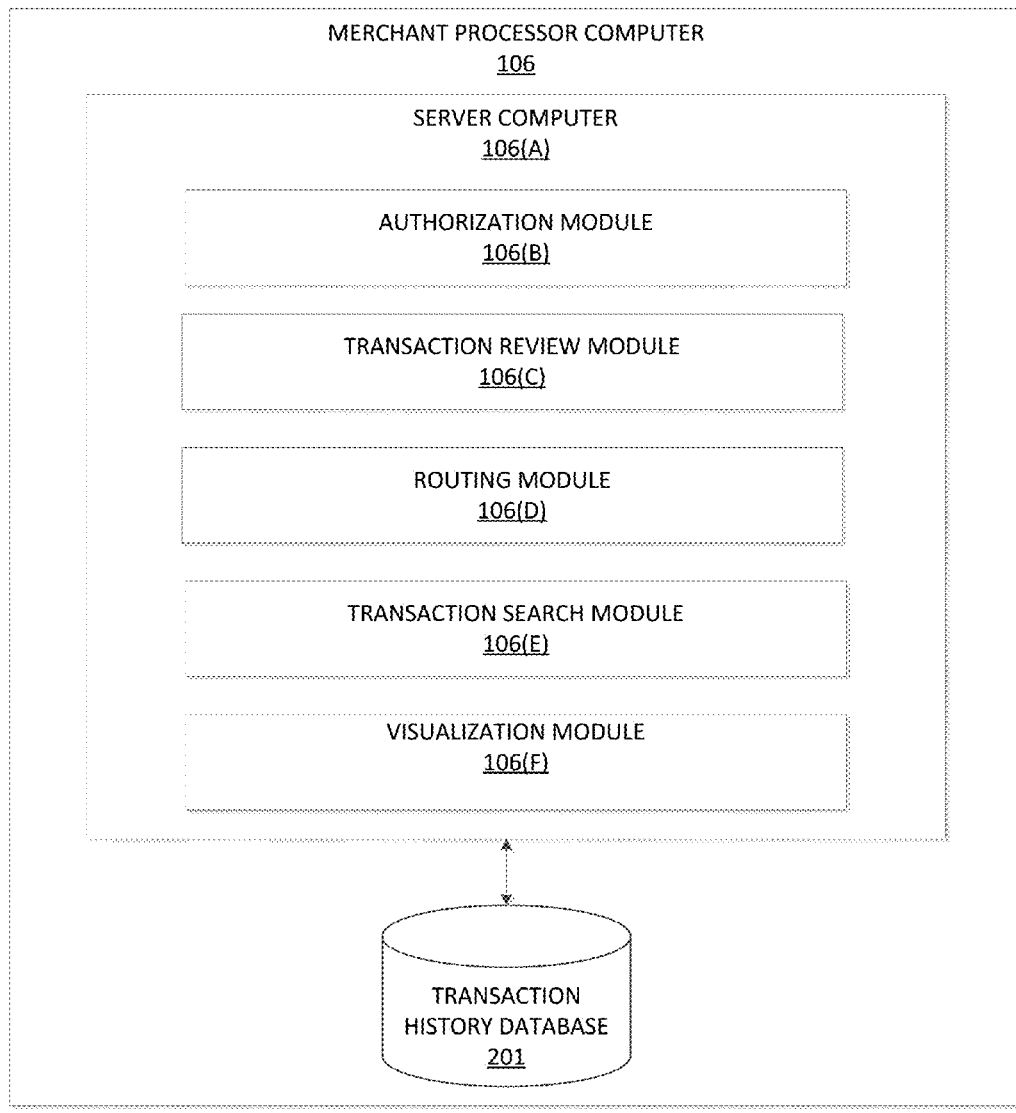
FIG. 2 illustrates an exemplary merchant processor computer according to embodiments of the present invention.

FIG. 2 illustrates an exemplary merchant processor computer, in one embodiment of the invention.

Merchant processor computer 106 may comprise a server computer 106(A) comprising authorization module 106(B), transaction review module 106(C), routing module 106(D), transaction search module 106(E), and visualization module 106(F). Merchant processor computer 106 may be communicatively coupled to transaction history database 201.

Transaction history database 201 stores transaction data associated with a plurality of transaction orders over a period of time. In some embodiments, the transaction data may include data elements such as a consumer name, a payment account identifier, an expiration date, a shipping address, a billing address, a phone number, an email address, a device fingerprint, an IP address, etc. It will be understood that the transaction data may also include other data elements such as a merchant identifier, a transaction identifier, date and time of the transaction, a location, a transaction amount, item descriptions, a consumer biometric identifier, etc. Merchant processor computer 106 may access transaction history database 201 to retrieve transaction data to be utilized for various purposes, including transaction review, search, or visualization.

Authorization module 106(B) may generate and process authorization request and response messages. Authorization module 106(B) may also determine the appropriate destination for the authorization request and response messages. An authorization request message is a message sent requesting that issuer computer 112 authorize a financial transaction. An authorization request message may comply, e.g., with ISO 8583, which is a standard for systems that exchange electronic transactions made by consumers using payment devices. In various embodiments, an authorization request message may include, among other data, a Primary Account Number (PAN) and expiration date associated with a payment device (e.g., credit/debit card) of the consumer, amount of the transaction (which may be any type and form of a medium of exchange such a money or points), and identification of a merchant (e.g., merchant ID). In embodiments, an authorization request message is generated by a server computer (if the transaction is an e-commerce transaction) or a Point of Sale (POS) device (if the transaction is a brick and mortar type transaction) and is sent to issuer computer 112.

Transaction review module 106(C) conducts a fraud evaluation for transactions. If transaction review module 106(C) determines that the transaction may be fraudulent, transaction review module 106(C) may determine that the transaction should be denied. If the transaction is not fraudulent, transaction review module 106(C) may determine that the transaction should be allowed. If transaction review module 106(C) is unable to determine whether the transaction is fraudulent, transaction review module 106(C) can determine that the transaction should be sent for further review.

Routing module 106(D) can route transactions to the appropriate destination. If a transaction is determined to be not fraudulent, routing module 106(D) can route the message to acquirer computer 108 for further processing, e.g., as part of an authorization request message or for clearing and settlement. If the transaction is determined to be fraudulent, routing module 106(D) can send the transaction back to the merchant. If the fraud evaluation conducted by transaction review module 106(D) is indeterminate, the transaction can be routed to a further review by a person.

Transaction search module 106(E) conducts searches amongst multiple transactions based on various parameters. For example, transactions can be searched by one or more of time, value, location, type, status, or any other defining characteristic. Transactions searches can be relative to a specific transaction, such as searching for all transactions conducted within a certain time period and distance of a particular confirmed fraudulent transaction. By allowing searches based on search parameters, transactions can be grouped based on specific characteristics and selected to be utilized for visualization providing focused analysis.

Visualization module 106(F) can receive selected transactions and display visualizations indicating correlations amongst the transactions. Visualization module 106(C) may receive transaction data associated with selected transactions that may include data elements such as customer payment card, email address, IP address, shipping address, and device fingerprint. Visualization module 106(F) can visually display relationships between the transactions based on their common data elements. For example, two transactions associated with the same customer payment card may be displayed as connected by the card, or common data elements. The visualization of transactions can allow for easier detection of potentially fraudulent patterns by providing visual cues, since transactions indicating various statuses (e.g., accepted, rejected, pending, suspect) can be displayed in data sets of related transactions. If a transaction within a data set is suspected to be fraudulent, the related transactions that are connected to the transaction may be identified as similarly fraudulent. In some embodiments, visualization module 106(F) can display visualization in various lay out formats (e.g., connected or disjointed graphs, providing diversity in the ways that transaction correlations can be visualized. Visualization module 106(F) can also provide a reviewer with mechanisms to interact with the visualizations, e.g., to select certain transaction orders that connect in a particular way, and then select an action to be performed (e.g., to accept or reject).

II. Case Management

Reviewing a long list of transactions in a review queue in order to determine if a transaction under consideration is related to any previous transactions is inefficient. The invention provides a way to isolate transactions by common characteristics and translate them into visualizations that can make fraud detection more intuitive. Further, the visualizations are interactive, allowing a reviewer to take action on transactions by interacting with an interface.

A. Search of Transaction Orders

Figure 3:
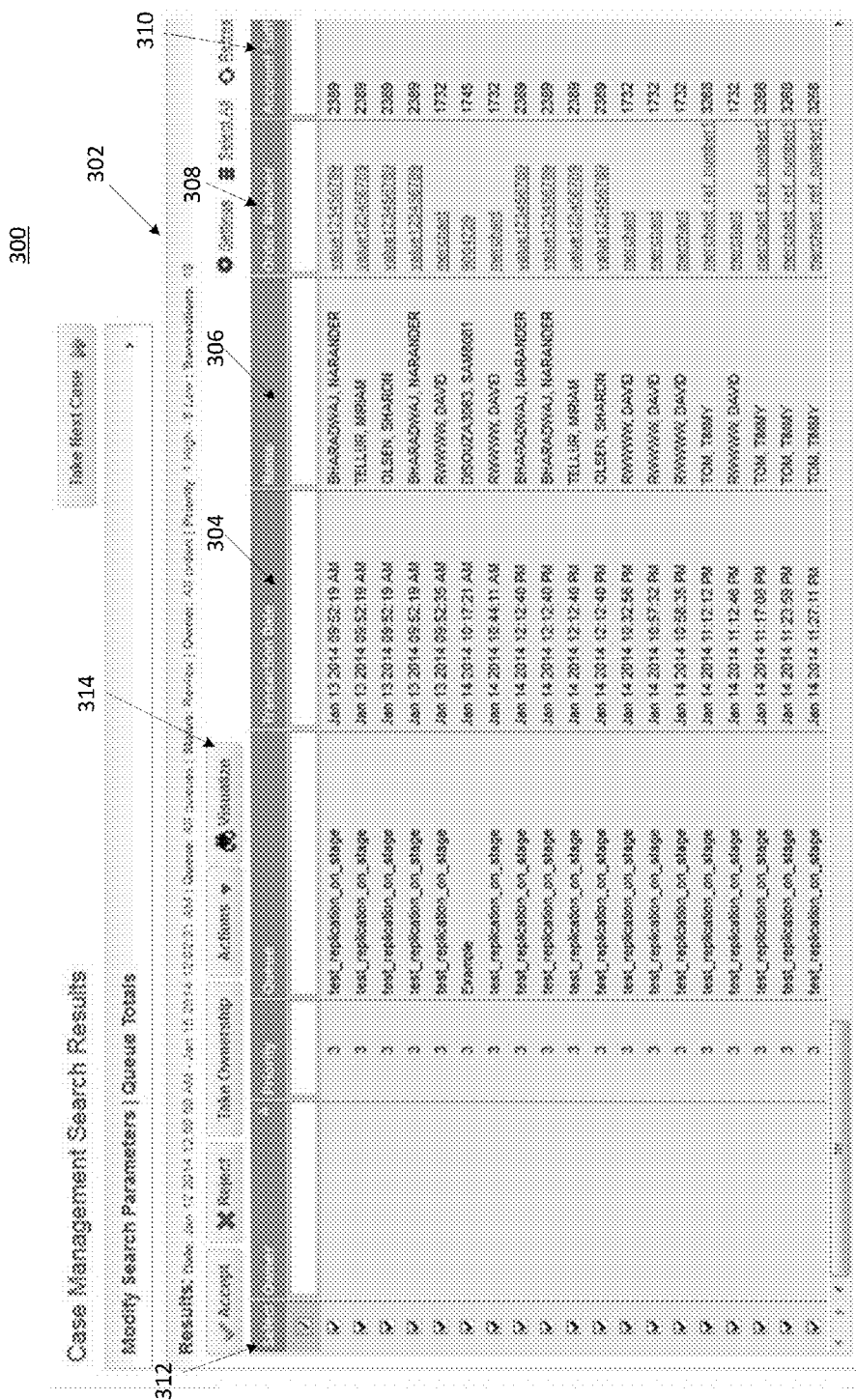
FIG. 3 shows a screen shot of search results from a review queue according to embodiments of the present invention.

FIG. 3 illustrates a screen shot 300 of search results from a review queue, in one embodiment of the invention.

As illustrated in the figure, a table 302 shows a number of transactions with a transaction date 304, a consumer name 306, an order number 308 and an account suffix 310. In one embodiment, the account suffix 310 may be last four digits of a payment account number. For example, the table 302 may be search results generated from a case management system (e.g., in the Decision Manager environment) based on certain search parameters (e.g., transactions in the last six months). Search parameters may include one or more of time, value, location, type, status, or any data elements stored in transaction data associated with transactions. A reviewer may be able to see details of the order by selecting an order. For example, some of the orders in the table 302 may have a status flag associated with them such as accepted, chargeback, rejected, etc.

In some embodiments, a reviewer may select a plurality of transaction orders in the table 302 to display the relationships among the selected orders visually on a display screen. For example, the transaction orders may be selected using a select button 312. Using a visualize button 314, the selected transaction orders may be visualized on the display screen. In some embodiments, clicking on the visualize button 314 may launch a visualization window showing visual connections among some of the selected orders based on their relationship.

B. Interface of Transaction Search Visualization

Figure 4:
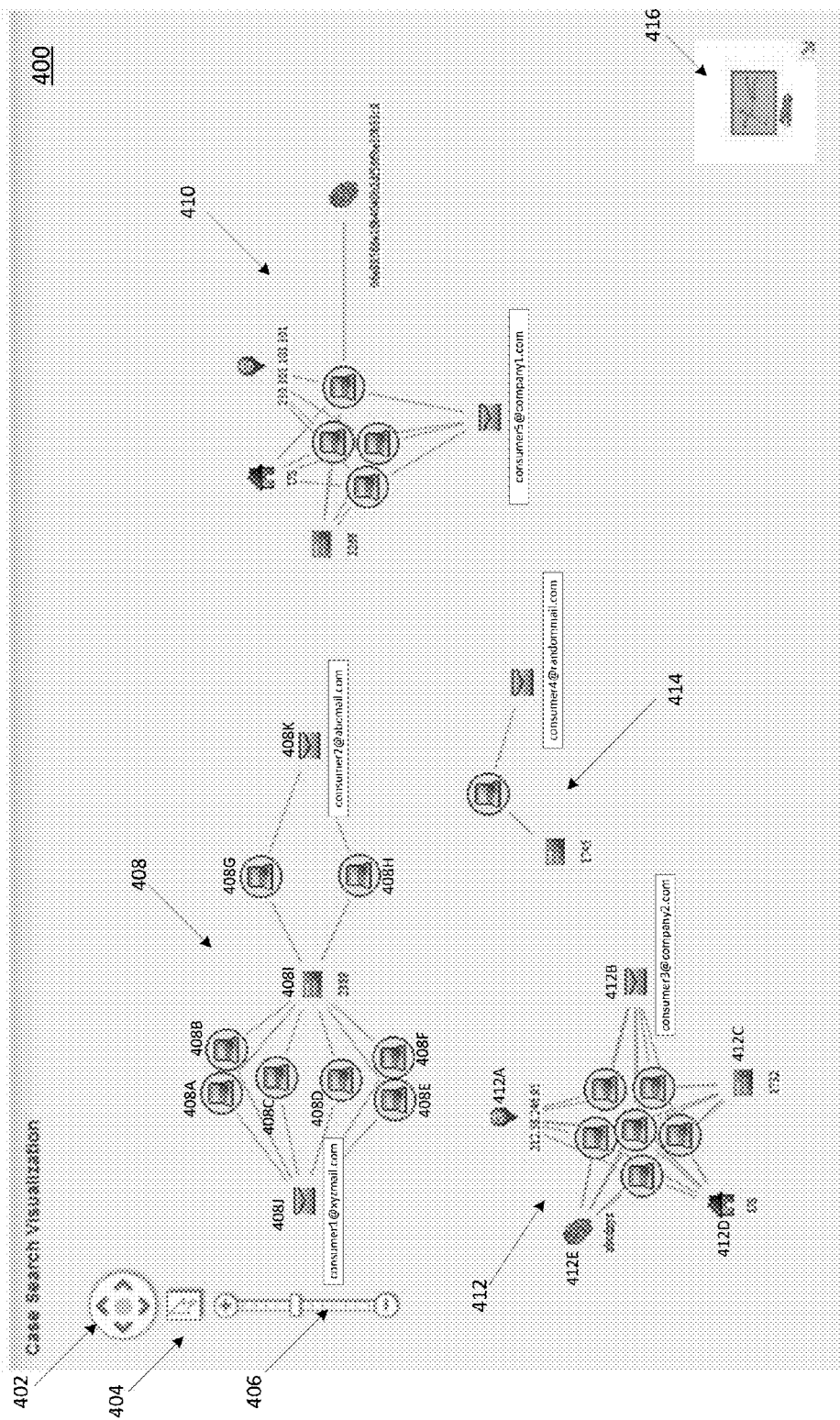
FIG. 4 shows a visualization window according to embodiments of the present invention.

FIG. 4 illustrates a visualization window 400, in one embodiment of the invention.

The visualization window 400 may be displayed on a display screen when a request for visualization of a plurality of transaction orders is received at a computer. For example, the computer may be the merchant processor computer 106 or communicatively linked to the merchant processor computer 106. The computer may include a processor and a computer readable medium (CRM), which may be in the form of a memory, and may comprise code, executable by the processor for implementing methods described herein. In some embodiments, the computer may be implemented similar to the computer apparatus as discussed with reference to FIG. 15. For example, the visualization window 400 may be displayed on the monitor 22 that may include a display screen, which may be communicatively coupled to the merchant processor computer 106.

As illustrated in FIG. 4, the visualization window 400 may display a navigation panel and a plurality of transaction orders visually connected based on one or more common data elements among a set of the transaction orders. While the exemplary visualization in FIG. 4 shows certain data elements, embodiments are not limited and any suitable data elements that can be utilized to correlate transactions can be used in visualization of transaction orders.

The navigation panel may comprise a scroll interface 402, an arrow cursor 404 and a slider 406. The scroll interface 402 may allow scrolling in a direction of an arrow in the scroll interface 402. A center circle in the scroll interface 402 may allow returning to an original centered location in the visualization window 400.

The arrow cursor 404 may be used to select one or more data objects or icons in the visualization window 400. For example, a single data object may be selected by clicking on the data object. Multiple data objects may be selected by holding down the mouse button and dragging it over the icons that the user wishes to select. When the mouse button is released, the icons may be selected. In some embodiments, clicking on the arrow cursor may change the arrow icon to a hand icon.

The slider 406 may be used to zoom in and out of the visualization window 300 by clicking on the plus (+) or minus (−) sign on the slider 406.

A miniature viewing window 416 may be used to scroll around the visualization window 400. A reviewer may use the arrow cursor in the miniature viewing window 416 to move to a certain location in the window and zoom in and out using the slide 406. This may be helpful when there are a large number of transaction orders displayed in the visualization window 400.

As shown in the visualization window 400, a set of transaction orders 408 may include a transaction order 408A, a transaction order 408B, a transaction order 408C, transaction order 408D, a transaction order 408E, a transaction order 408F, a transaction order 408G and a transaction order 408H. In some embodiments, a status icon associated with a transaction order may be shown attached or close to the transaction order. For example, a status icon may show a checkmark (accept), a cross (reject) or an exclamation point (suspect or fraud). The transaction orders without the status icon may indicate the orders under review. Each of the transaction orders 408A-408H may include one or more data elements that are shown as corresponding data objects or icons. For example, all the transaction orders in set 408 may be correlated by a payment account identifier 408I (e.g., account suffix 310 as shown in FIG. 3), wherein the transaction orders 408A-408F may be correlated by an email address 408J, and the transaction orders 408G-408H may be correlated by an email address 408K.

The visualization window 400 may also display a set of transaction orders 410 and a set of transaction orders 412. As shown in FIG. 4, the set of transaction orders 412 may include a plurality of transaction orders where some of the orders may be correlated based on an IP address 412A, an email address 412B, a payment account identifier 412C, a shipping address 412D or a device fingerprint 412E.

In some examples, a transaction order 414 may not include any data elements that are correlated with other transaction orders. Since a single transaction order with no correlation to other transactions does not provide information regarding correlations with existing fraud, a reviewer may not want to see it in the visualization. Accordingly, in some embodiments, such transaction orders may be marked to hide or not display in visualization window 400.

C. Interactive Visualization

In some embodiments of the invention, a reviewer may use a pointing device, for example, a mouse or a touchscreen to interact with a visualization of transaction orders. Interactions may include selecting one or more transaction orders and determining certain actions to be taken on the selected transactions. Using the arrow cursor 404, referring back to FIG. 4, one or more data objects may be selected. This is further explained with reference to FIG. 5.

Figure 5:
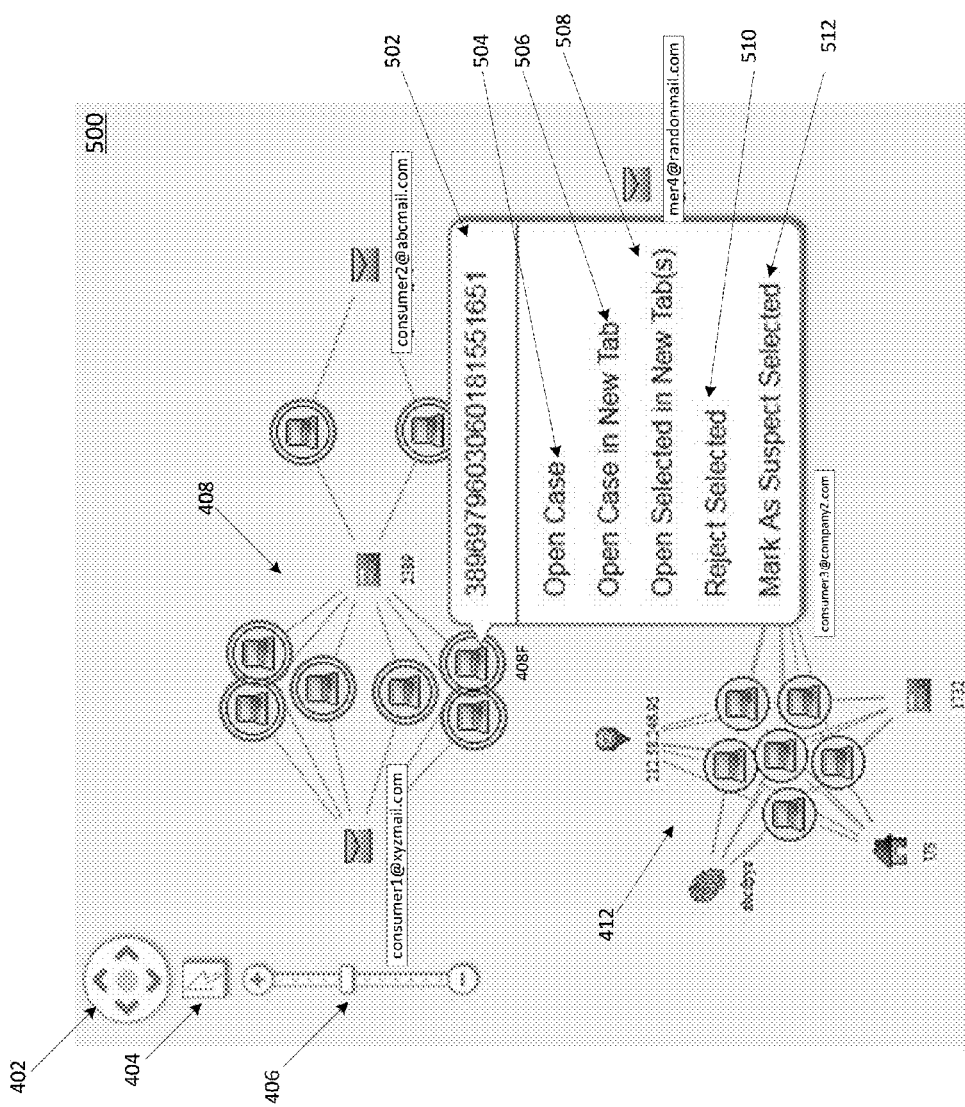
FIG. 5 shows a visualization window with a menu selection according to embodiments of the present invention.

FIG. 5 illustrates a visualization window 500 with a menu selection, in one embodiment of the invention.

The menu selection can be utilized to display information about or carry out actions on selected transactions. Transactions can be selected by clicking individual transaction order icons or selecting multiple transaction orders by dragging a selection box around the icons. There may be visual feedback to indicate when transactions have been selected. For example, an outline may surround selected transaction order icons as shown in data set 408, indicating that eight transactions, including transaction order 408F, have been selected.

As illustrated in the figure, a menu 502 may include a plurality of options for a reviewer to select. A reviewer may select a transaction order by right clicking on the transaction order in the visualization window. For example, by right clicking on the transaction order 408F, a pull down menu may be displayed on the display screen. In some embodiments, the menu 502 may include a plurality of options such as an open case option 504, an open case in new tab option 506, an open selected in new tab(s) option 508, a reject selected option 510 and a mark as suspect selected option 512.

Figure 6:
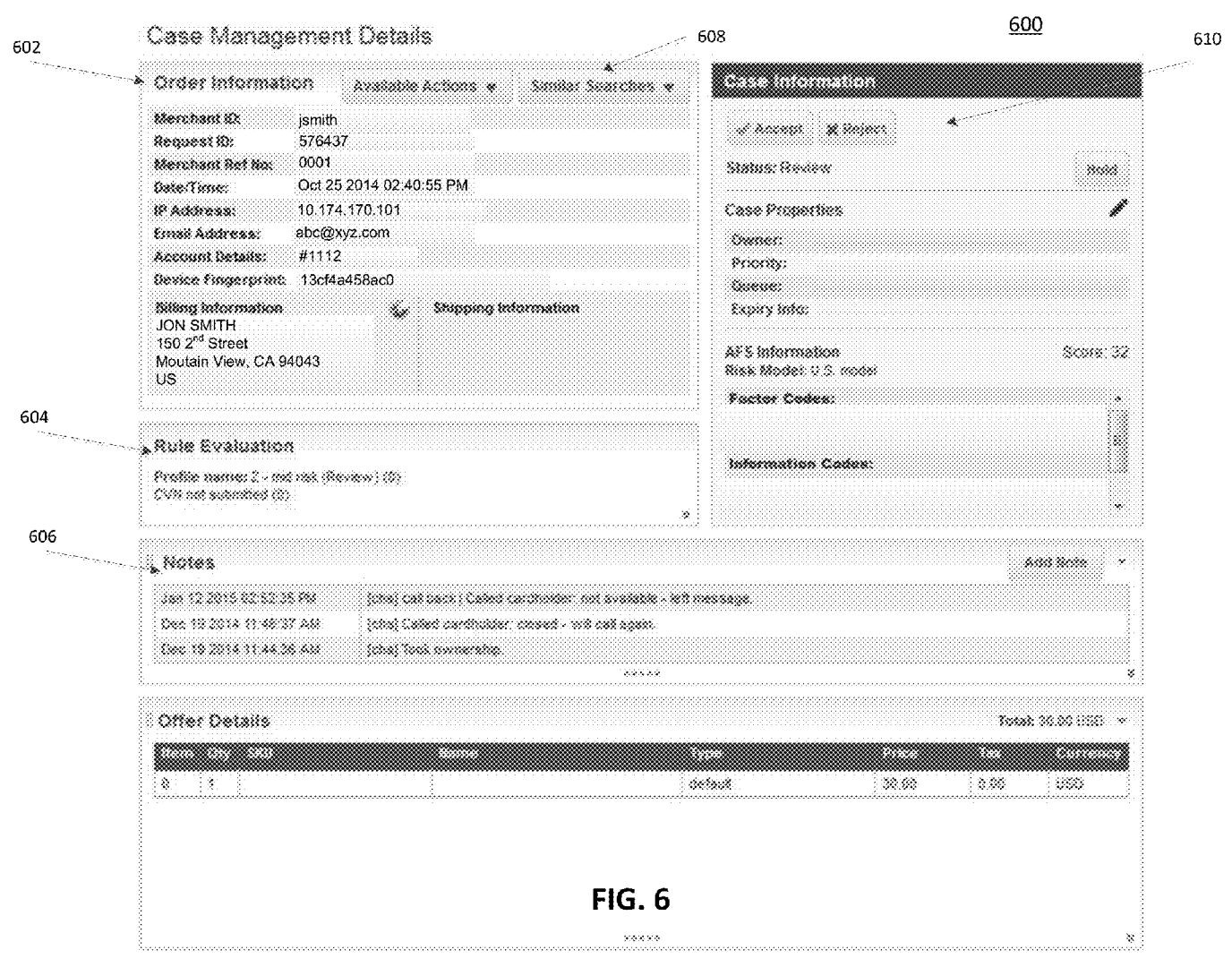

In some embodiments, the open case option 504 may navigate away from the visualization window 500 and display details of the transition order 408F in a tabular form. The open case in new tab option 506 may open a new browser tab to display details of the transition order 408F in a tabular form while leaving the visualization window 500 open. An exemplary display of details of a transaction is shown in FIG. 6. The open selected in new tab(s) option 508 may open a new browser tab to display details of each selected transition order in a tabular form while leaving the visualization window 500 open. This may allow a reviewer to view details for a plurality of transaction orders or cases without navigating away from the visualization window 500.

In some embodiments, the reviewer may analyze the transaction details of the correlated transactions and may take certain actions on some or all of the selected transactions by marking those transactions, as described below. For example, if one or more transactions in a set of transactions have a reject or suspect status flag associated with them, then all the correlated transactions that share one or more common data elements (e.g., same payment account identifier) with those previously rejected or suspected transactions can be marked rejected and/or suspected. This may allow quick detection of any future fraudulent transactions initiated using the same payment account identifier. As another example, if one or more transactions in a set of transactions have an accept status flag associated with them, it may indicate a good transaction and all the correlated transactions that share one or more common data elements with those previously accepted transactions can be marked as accepted. This may allow the reviewers to focus and detect the transactions that are clearly non-fraudulent in a timely manner.

Figure 7:
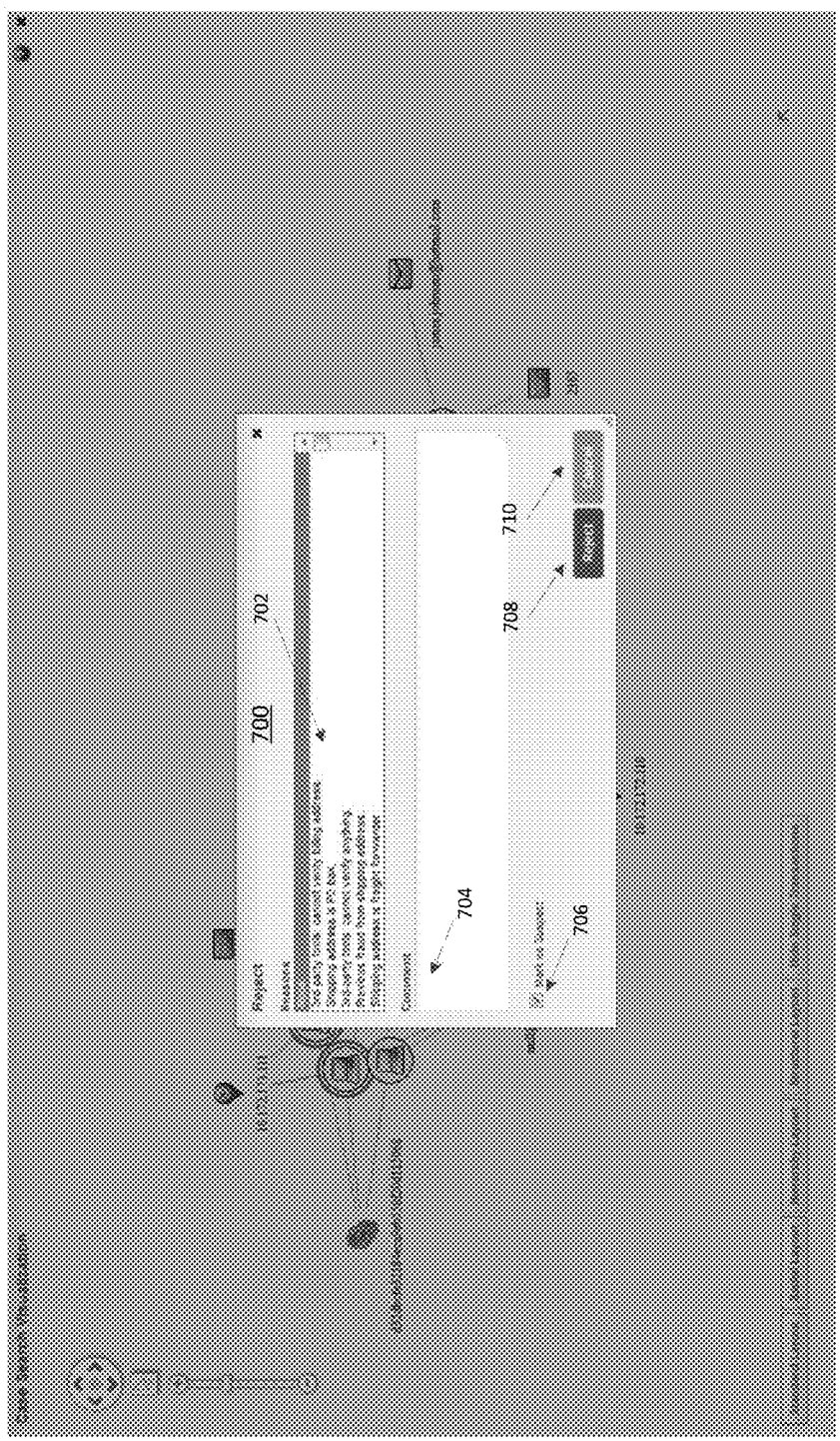
FIG. 7 shows a dialog box in response to rejecting a transaction according to embodiments of the present invention.

In some embodiments, one or more transaction orders may be marked as reject, accept, or suspect by selecting the one or more transaction orders. For example, by holding down the Shift key or the Ctrl key while clicking on the transaction multiple orders may be selected. Alternatively, multiple orders may be selected using the arrow cursor 404 as discussed previously. By right clicking one of the selection transactions, from a pull down menu, a desired option may be selected for the selected transaction orders. In some embodiments, a status flag may be assigned to each of the selected transaction order. For example, selecting the reject selected option 510 may mark all the selected transactions as rejected. In some embodiments, a dialog box may be displayed on the display screen when a transaction is marked as rejected. An exemplary dialog box is shown in FIG. 7.

Figure 8:
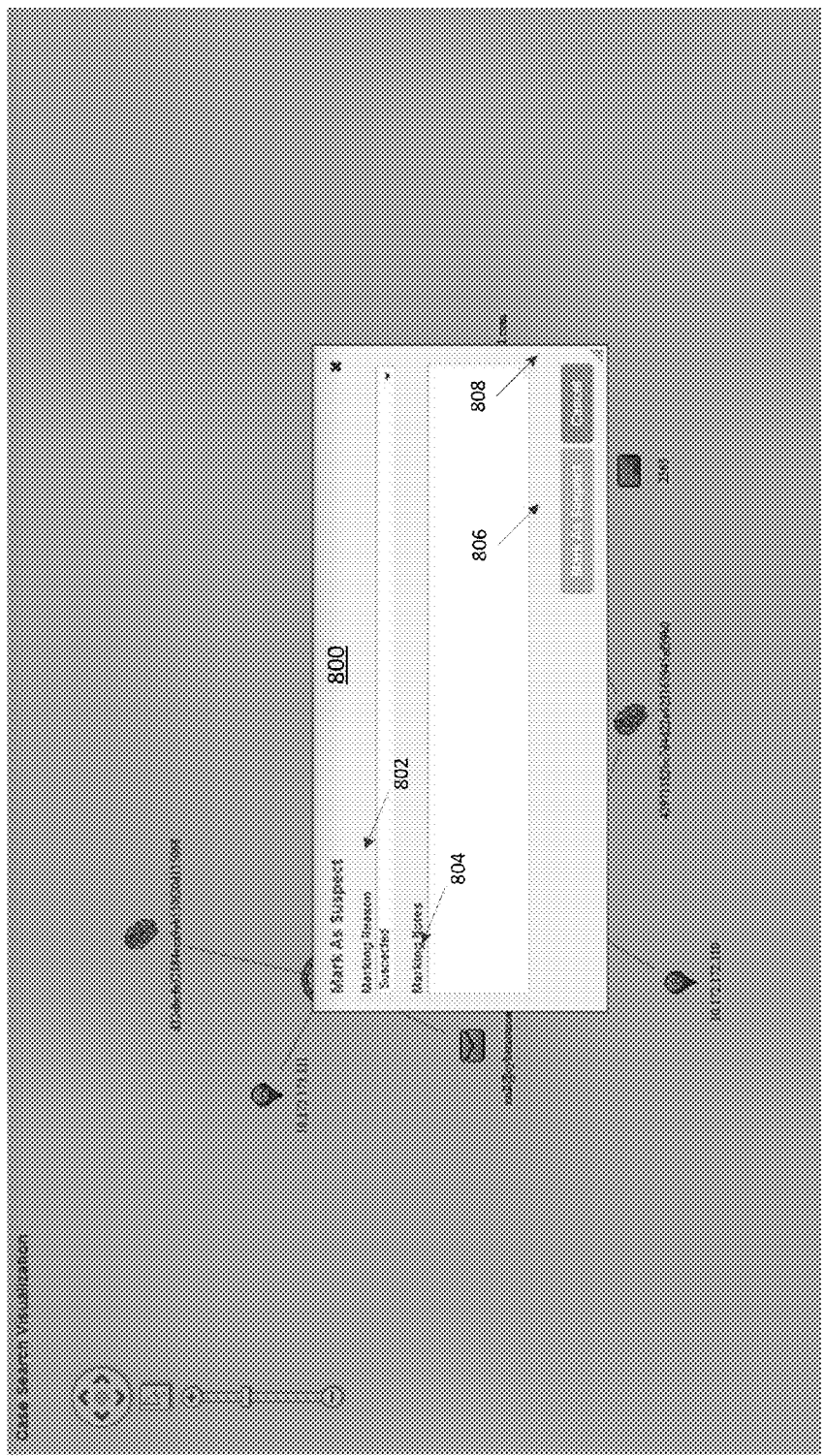
FIG. 8 shows a dialog box in response to marking a transaction as suspect according to embodiments of the present invention.

In some embodiments, the mark as suspect selected option 512 can be selected to mark transactions as suspect. Information associated with suspected transaction orders may be added to a negative list to be used for future fraud detection. In some embodiments, a dialog box may be displayed on the display screen when a transaction is marked as suspect. An exemplary dialog box is shown in FIG. 8.

Embodiments of the invention provide benefits by providing an interactive visualization that allows actions to be taken on transactions displayed in the visualization with simple steps. The visualization enables selecting multiple transactions. Further, the visualization enables updating the statuses e.g., suspect, reject, accept) of selected transactions by interacting with a menu option. Updates can be made to multiple selected transactions by simply right clicking on one of the transactions in the set of selected transactions. This displays the menu, where selecting an option in the menu can apply the selected action to all selected transactions at once. This is more efficient than selecting single transactions in a set of correlated transactions and individually marking them with updated statuses.

FIG. 6 shows case details 600 displayed in response to selecting a menu option, in one embodiment of the invention.

As examples, case details 600 may be displayed in response to the selection of open case option 504 or open case in new tab option 506, as shown in FIG. 5. Case details 600 can be useful to a reviewer who may want to see further information surrounding a particular transaction for any reason. For example, a reviewer may want to check certain details about a transaction that are not shown in the visualization before rejecting it. In addition to viewing information, a reviewer may conduct further searching or actions based on information provided in case details 600.

Case details 600 may display information, which may include order information 602, rule evaluation 604, and notes 606 associated with a transaction. Order information 602 may include transaction data details, such as merchant ID, date/time, IP address, email address, account details, device fingerprint, and shipping address. Rule evaluation 604 may include information about the result of a transaction review carried out on the transaction, such as a risk level. Notes 606 may include user input information that can provide background about the history of the transaction.

Case details 600 may also provide the option to carry out similar searches option 608. The "similar searches option" 608 may enable further searches that may be helpful to the reviewer based on case details of the transaction. For example, if the reviewer determines that the transaction is somewhat risky based on rule evaluation 604, "similar searches" option 608 may allow the reviewer to conduct a new search centered on the transaction. The results of the search can be utilized as input to a new visualization window. The reviewer may set additional search parameters to narrow the search, such as searching for transactions that occurred around the same time or location as the transaction or share a common data element with the transaction. A new visualization can be displayed corresponding to the new search that can allow the reviewer to easily detect transaction orders related to the transaction and analyze their characteristics. In some embodiments, the reviewer may conduct a new search centered on multiple transaction orders, or one or more transaction details included in order information 602.

Case details 600 may also comprise a status selector option 610 that allows the reviewer to select a status corresponding to the transaction. After reviewing details surrounding the transaction and further analyzing by utilizing similar searches option 608, the reviewer may accept or reject the transaction in the case details 600 page. If the reviewer selects to reject the transaction (e.g., via reject selected option 510 in visualization window 500), a dialog box may be displayed in response, which is shown in FIG. 7.

FIG. 7 shows a dialog box 700 in response to rejecting a transaction, in one embodiment of the invention. The dialog box 700 includes a list of potential reasons 702, comment area 704, mark as suspect checkbox 706, reject option 708, and cancel option 710. The dialog box 700 may prompt the reviewer to select a reason from a plurality of reasons 702 regarding why the transaction is being rejected and input any additional information in comment area 704. In addition, the mark as suspect checkbox 706 allows the reviewer to select whether the transaction should be marked as suspect. This information can be associated with the transaction and stored so that future searches or visualizations comprising the transaction may provide such information entered by the reviewer. In some embodiments, the information entered in the dialog box may apply to and be associated with all selected transactions in a selected set of transaction orders.

In various embodiments, the reviewer can confirm or cancel the rejection of the transaction by activating reject option 708 or cancel option 710, respectively. If cancel option 710 is selected, the selected transaction is not rejected and information input into dialog box 700 is not stored. If reject option 708 is selected, the status of the selected transaction is updated accordingly and information input into dialog box 700 is associated with the transaction. In some embodiments, reject option 708 may be grayed out and not be able to be activated until the reviewer inputs information for reasons 702 and comments area 704 in dialog box 700. This can ensure the reviewer intentionally marked the transaction as rejected.

After a selection of transactions is rejected, visualization window 500 may be refreshed. In some embodiments, the visualization window 500 may erase the rejected transactions and only display visualizations of the remaining transactions in review.

FIG. 8 shows a dialog box 800 in response to marking a transaction as suspect, in one embodiment of the invention. Dialog box 800 may appear when suspect selected option 512 is selected from visualization window 500. As shown, the dialog box 800 includes a list of marking reasons 802, marking notes area 804, mark as suspect option 806, and a cancel option 808. The dialog box 800 may prompt the reviewer to select a reason from a plurality of reasons 802 regarding why the transaction is being rejected and to input any additional information in marking notes 804.

The reviewer can confirm or cancel the marking as suspect of the transaction by activating mark as suspect option 806 or cancel option 808, respectively. If cancel option 808 is selected, the selected transaction is not marked as suspect and information input into dialog box 800 is not stored. If mark as suspect option 806 is selected, the status of the selected transaction is updated accordingly and information input into dialog box 800 is associated with the transaction. In some embodiments, mark as suspect option 806 may be grayed out and not be able to be activated until the reviewer inputs information for reasons 802 and marking notes area 804 in dialog box 800. This can ensure the reviewer intentionally marked the transaction as suspect.

Figure 9:
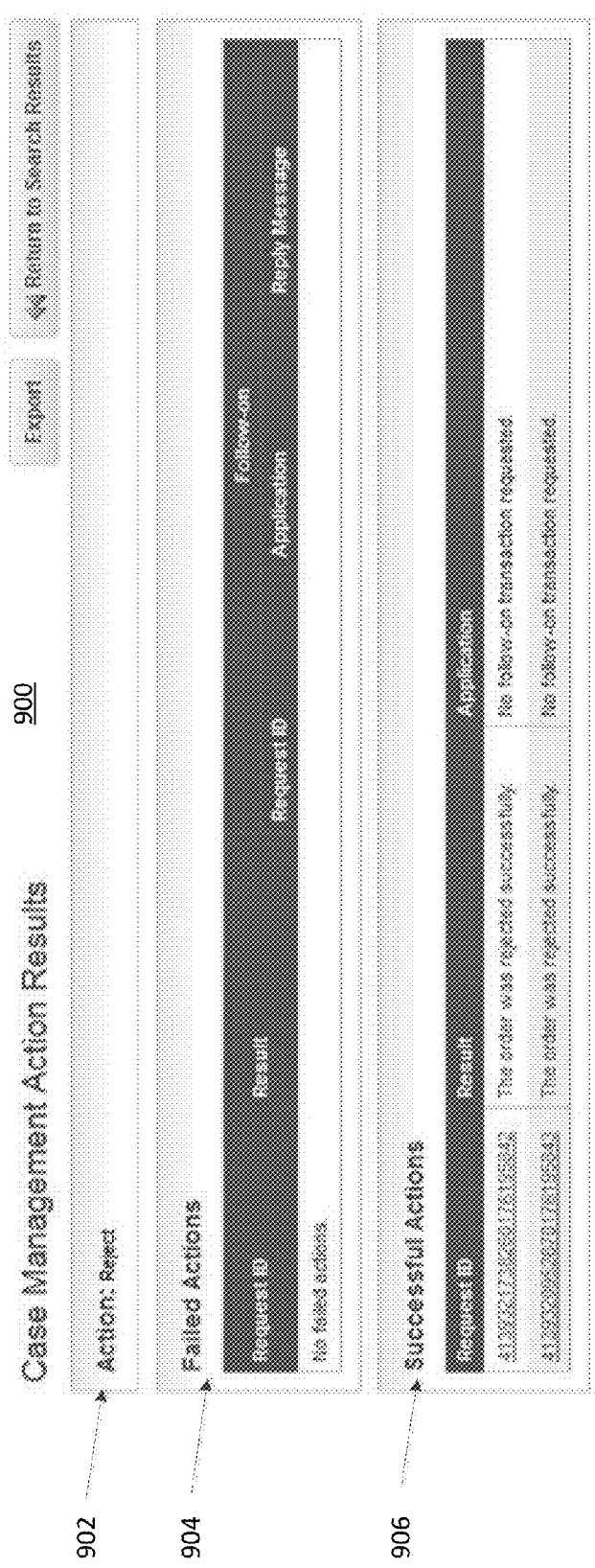
FIG. 9 shows results of actions taken on transactions according to embodiments of the present invention.

FIG. 9 shows results of actions taken on transactions, in one embodiment of the invention. After the reviewer takes certain action on a transaction, such as rejecting it or marking it as suspect, action results 900 will be displayed. Information provided by action results 900 can serve as confirmation to the reviewer that appropriate actions were conducted and carried out successfully.

The display of action results 900 comprises the action type 902, a table of failed actions 904, and a table of successful actions 906. If the reviewer conducted a rejection of transactions, the action type 902 should display "Reject," as shown in FIG. 9. If any other action was conducted, the corresponding label should be displayed as action type 902 (e.g., "Mark as suspect"). If any actions conducted on a transaction fail for any reason, they are displayed in a table of failed actions 904 and are identified by a request identifier. If any actions conducted on a transaction are successful, they are displayed in a table of successful actions 906 and are identified by a request identifier. In some embodiments, further information about a transaction can be displayed by clicking on the corresponding entry in the table of failed actions 904 or table of successful actions 906.

Figure 10:
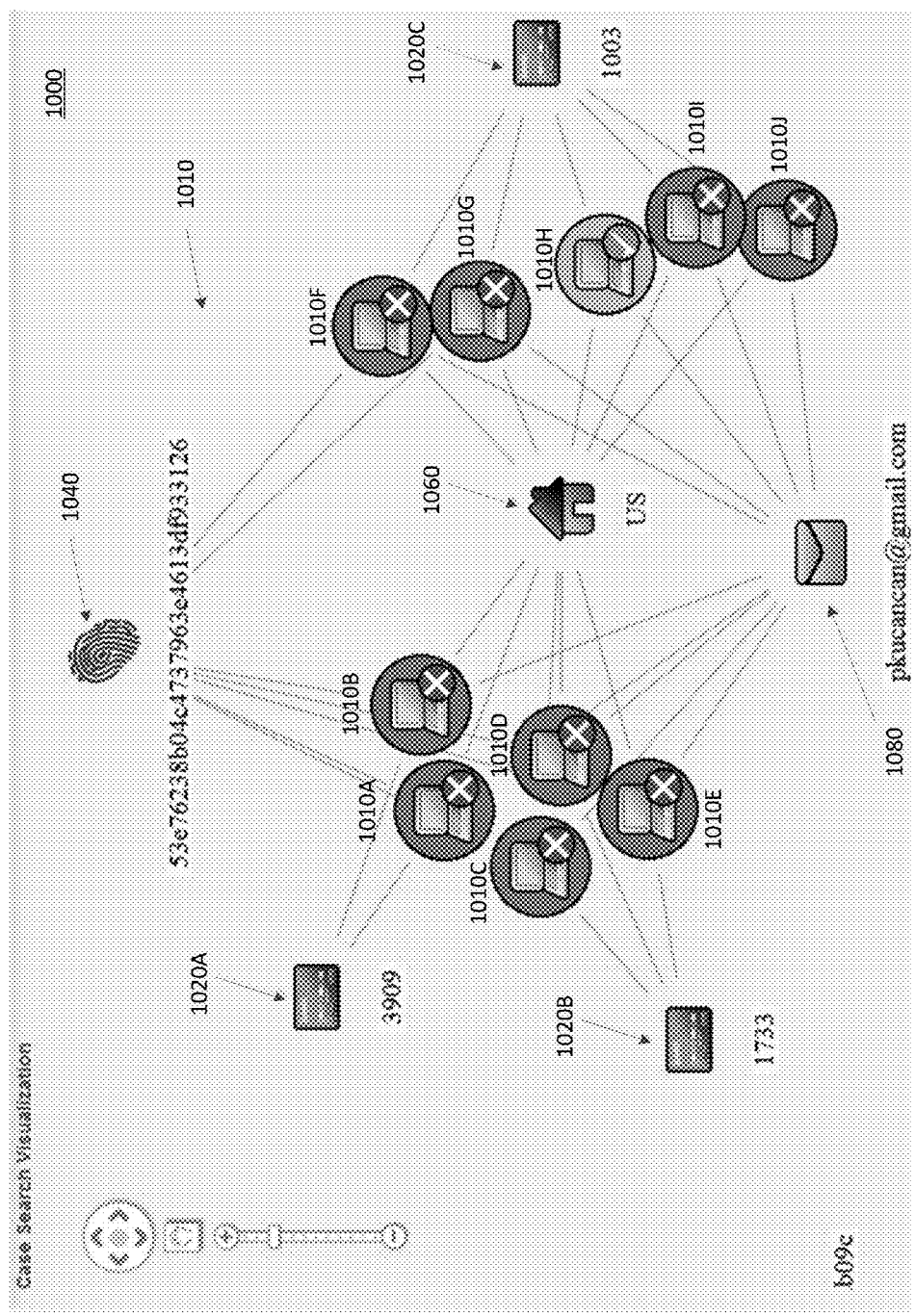
FIG. 10 shows a visualization including rejected and accepted transactions according to embodiments of the present invention.

FIG. 10 shows a visualization 1000 of a data set 1010 including rejected and accepted transactions, in one embodiment of the invention. FIG. 10 includes transaction order 1010A, transaction order 1010B, transaction order 1010C, transaction order 1010D, transaction order 1010E, transaction order 1010F, transaction order 1010G, transaction order 1010H, transaction order 1010I, and transaction order 1010J. In the visualization of FIG. 10, transaction orders 1010A-1010J make up a data set of transaction orders. However, transaction orders 1010A-1010G and transaction orders 1010I-1010J are rejected transactions and transaction order 1010H is an accepted transaction. As examples, the status of transaction orders can be indicated by a status icon that may show a checkmark (accept), a cross (reject) or an exclamation point (suspect or fraud). Various colors can be used in addition or instead. Accordingly, rejected transactions have icons comprising a cross and accepted transaction 1010H has an icon comprising a checkmark. FIG. 10 also comprises various data elements, which include payment card identifier 1020A, payment card identifier 1020B, payment identifier 1020C, device fingerprint 1040, shipping address 1060, and email address 1080.

In visualization 1000, each of the transaction orders 1010A-1010J may include one or more data elements that are shown as corresponding data objects or icons. For example, transaction orders 1010A-1010J may be correlated by shipping address 1060 and email address 1080, while transaction orders 1010A-1010G may be correlated by device fingerprint 1040. Further, transaction orders 1010A-1010B may be correlated by payment account identifier 1020A (e.g., account suffix 3909), transaction orders 1010C-1010E may be correlated by payment account identifier 1020B (e.g., account suffix 1733), and transaction orders 1010E-1010J may be correlated by payment account 1020C (e.g., account suffix 1003).

Displaying transactions correlated by data elements allows for quick visual indication of transaction orders that are related to other rejected transaction orders. For example, visualization 1000 shows transaction order 1010H as being associated with shipping address 1060 related to nine rejected transaction orders (e.g., 1010A-1010G and 1010I-1010J). email address 1080 related to nine rejected transaction orders (e.g., 1010A-1010G and 1010I-1010J). and payment account identifier 1020C related to four rejected transaction orders (e.g., 1010F-1010G and 1010I-1010J). Since visualization 1000 shows transaction order 1010H as having correlations to multiple rejected transactions, a reviewer reviewing data set 1010 may identify transaction order 1010H as fraudulent as reject it. In some embodiments, the reviewer may interactively select and view details about transaction order 1010H before rejecting it.

Without the interactive aspects of the visualization, taking actions on transactions would be time consuming and inefficient as it would require a reviewer to parse a list of transactions in order to find common data elements amongst transactions and determine whether each related transaction is rejected. Providing a visualization that visually connects transaction orders by common data elements allows for easier and quicker detection of potentially fraudulent transactions. Additionally, the interactive aspects of the visualization allow for a more intuitive process for taking action on transaction orders by enabling the selection of one or more transactions and enabling the status update of all of the selected transactions at once.

D. Visualization Layout Options

Figure 11:
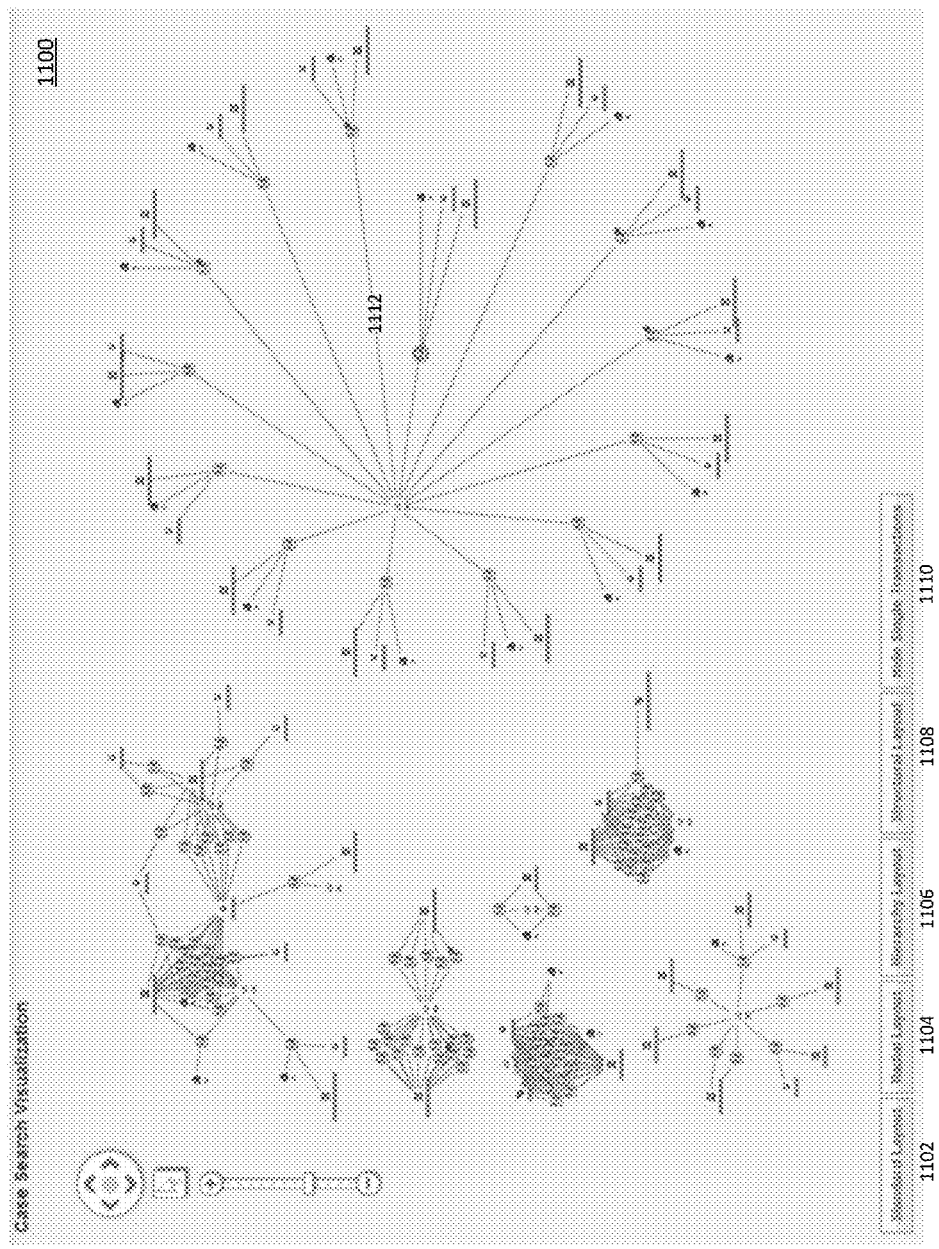
FIG. 11 shows correlation among a plurality of transactions in a radial layout according to embodiments of the present invention.
Figure 12:
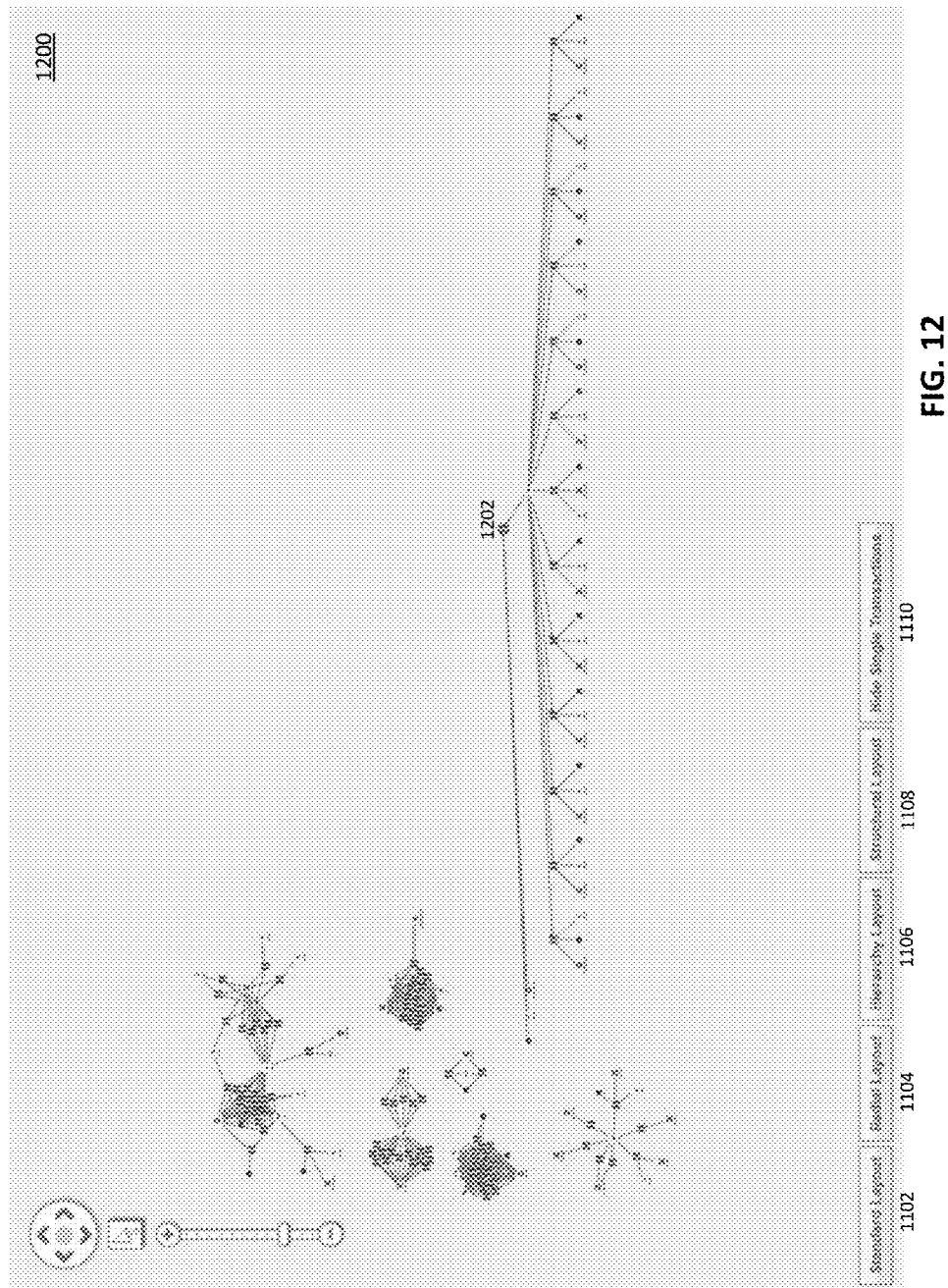
FIG. 12 shows correlation among a plurality of transactions in a hierarchy layout according to embodiments of the present invention.
Figure 13:
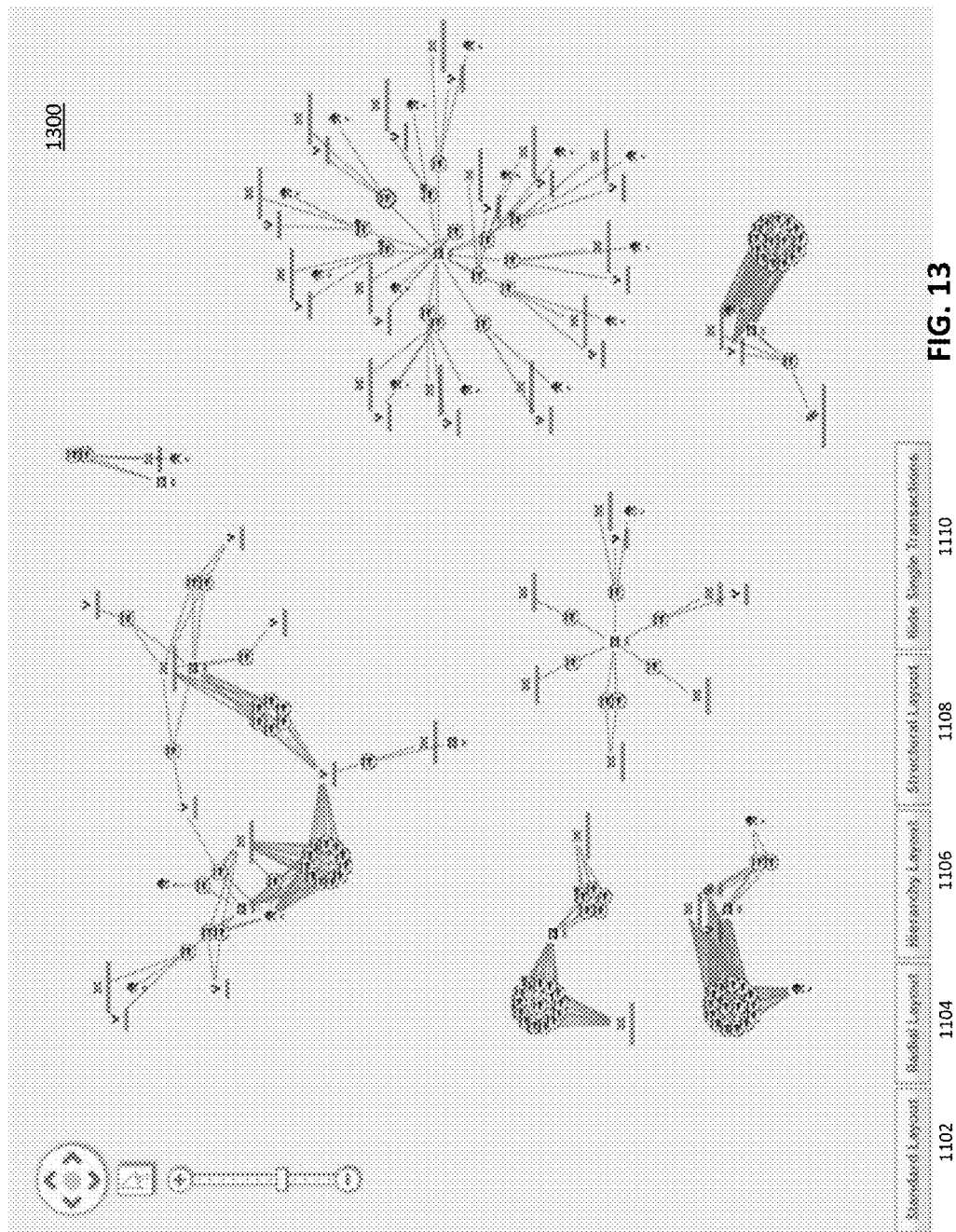
FIG. 13 shows correlation among a plurality of transactions in a structural layout according to embodiments of the present invention.

Embodiments of the invention provide a plurality of layout options to further enhance the visualization of the correlation among multiple transaction orders, as shown with reference to FIGS. 11, 12 and 13. For example, a reviewer may select a standard layout as shown in FIG. 4, a radial layout, a hierarchy layout or a structural layout.

FIG. 11 illustrates a radial layout 1100, in one embodiment of the invention. As illustrated in the figure, a reviewer may select a standard layout option 1102, a radial layout option 1104, a hierarchy layout option 1106, a structural layout option 1108 and a hide single transactions option 1110.

In one embodiment, the radial layout option 1104 may arrange transaction orders in concentric circles around a selected transaction order. This may make it easier to determine the number of links existing between the selected transaction order and the other transaction orders. Before clicking the radial layout option 1104, a transaction order may be selected as the center node (e.g., 1112). The radial layout option 1104 may be useful when the data elements between different transaction orders are highly connected.

The hide single transactions option 1110 may enable to hide a selected transaction order so it is not displayed on the visualization window. For example, single transaction orders that are not correlated with other transaction orders (e.g., do not share any data elements, as shown in data set 414 of FIG. 4) may be good candidates for selecting the hide single transactions option 1110.

FIG. 12 illustrates a hierarchy layout 1200, in one embodiment of the invention. In one embodiment, the hierarchy layout option 1106 may arrange transaction orders in a hierarchy under a selected transaction order. The hierarchy layout option 11106 may be useful when the data elements are hierarchical. Before clicking the hierarchy layout option 1106, a transaction order may be selected as the apex of the hierarchy, for example, a transaction order 1202.

FIG. 13 illustrates a structural layout option 1300, in one embodiment of the invention. In one embodiment, the structural layout option 1108 may arrange similar transaction orders together. The structural layout option 1108 may be useful when the transaction orders have similar data elements, for example, when all the transaction orders have the same payment account identifier or the email address.

E. Method

Figure 14:
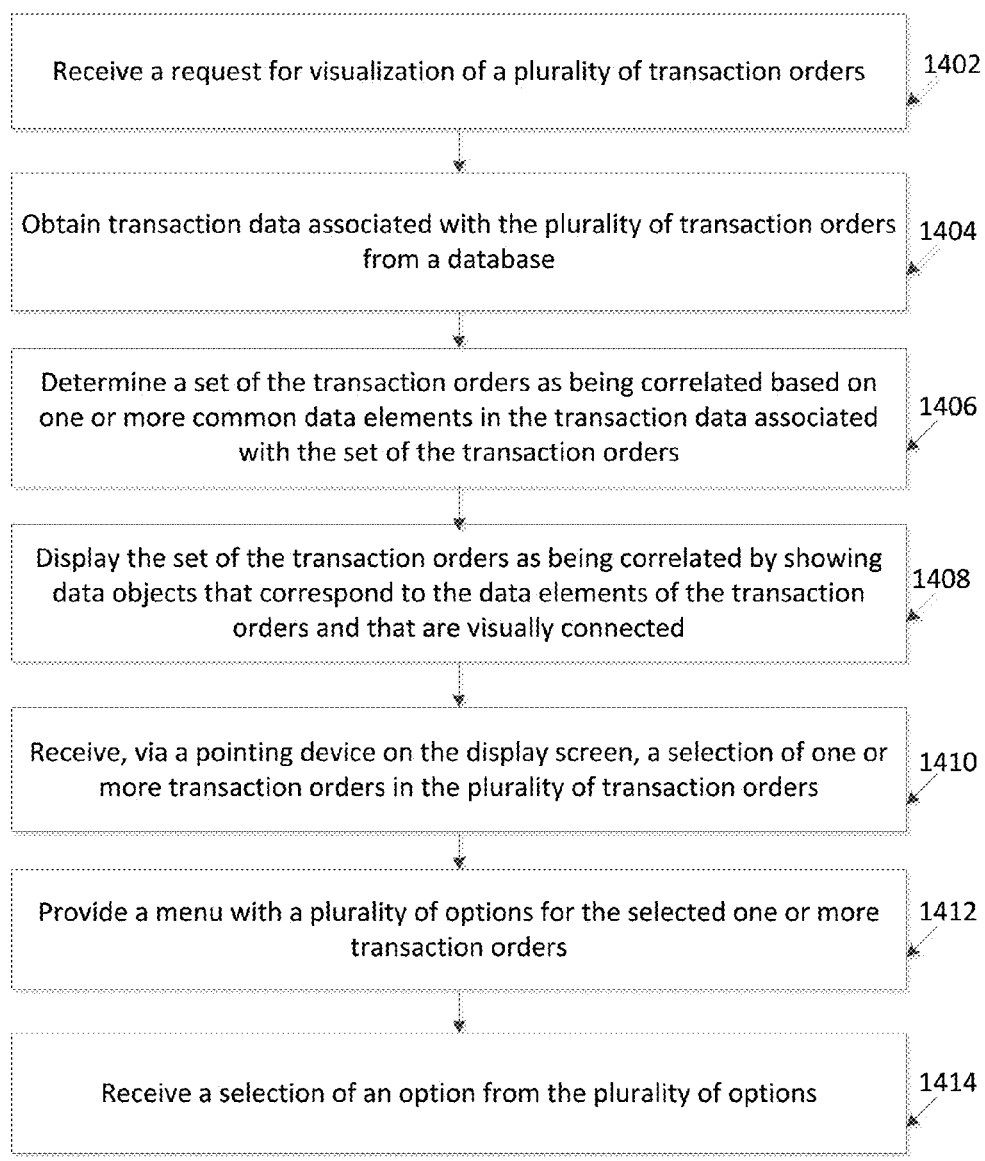
FIG. 14 illustrates a flow chart for performing a method according to embodiments of the present invention.

FIG. 14 illustrates a flow chart 1400 for performing a method in accordance with an embodiment of the invention.

In step 1402, a request for visualization of a plurality of transaction orders may be received. For example, as discussed with reference to FIG. 3, the visualize button 314 may be selected to request for visualization of a plurality of transaction orders. The plurality of transaction orders may be selected by clicking on the select button 312 or by other means. The request may be received by the merchant processor computer 106 or a computer communicatively coupled to it.

In step 1404, transaction data associated with the plurality of transaction orders is obtained from a database, wherein each transaction order is composed of data elements. For example, the merchant processor computer 106 may be communicatively coupled to transaction history database 201, as discussed with reference to FIG. 2, storing transaction data associated with a plurality of transaction orders over certain duration of time. As discussed previously, the data elements may include a consumer name, a payment account identifier, a shipping address, a billing address, a phone number, an email address, a device fingerprint, an IP address, etc.

In step 1406, a set of the transaction orders is determined as being correlated based on one or more common data elements in the transaction data associated with the set of the transaction orders. For example, the merchant processor computer 106 may determine which transaction orders are correlated based on the one or more data elements among the plurality of transaction orders obtained from the transaction history database 201. For example, a first transaction order may share the same email address with a second transaction order and the same shipping address with a third transaction order. The second transaction order may share the same payment account number with a fourth transaction order and so on. Referring back to FIG. 4, the transaction order 408A is correlated with the transaction orders 408B-408F based on the same email address 408J and with the transaction orders 408G-408H based on the same payment account identifier 408I.

In step 1408, the set of the transaction orders may be displayed on a display screen as being correlated by showing data objects that correspond to the data elements of the transaction orders and that are visually connected. For example, the merchant processor computer 106 may display the correlation among the transaction orders on a display screen such as the monitor 22. Referring back to the previous example, FIG. 4 displays the transaction order 408A visually connected with the transaction orders 408B-408F based on the email address 408J and visually connected with the transaction orders 408G-408H based on the payment account identifier 408I.

In step 1410, one or more transaction orders in the plurality of transaction orders may be selected via a pointing device on the display screen. The selection may be received by the merchant processor computer 106. As discussed previously with reference to FIGS. 4-5, the one or more transaction orders may be selected using the arrow cursor 404, Ctrl key, Shift key or by touching the data objects or icons on a touch sensitive display screen.

In step 1412, a menu with a plurality of options for the selected one or more transaction orders may be displayed on the display screen. As discussed previously with reference to FIG. 5, the menu 502 may be displayed on the display screen when the transaction order 408F is right clicked. It will be noted that the transaction order 408F may have been selected by itself or along with other transaction orders in set 408. The menu 502 may provide a plurality of options for a reviewer to assign a status to the one or more selected transaction orders.

In step 1414, a selection of an option from the plurality of options is received. Referring back to FIG. 5, the transaction order 408F or the selected transaction orders may be marked as reject or suspect. An action can be performed based on the selected option. In some embodiments, marking a transaction order may assign a status flag to the marked transaction order. In some embodiments, a transaction order marked as a suspect may be rejected and added to a negative list. In some embodiments, if a transaction in a set of transactions is marked as a suspect, wherein one or more transactions in the set of transactions were previously accepted, those one or more transactions may be marked as suspect as well since they may result in probable charge backs.

III. Fraud Detection Utilizing Transaction Search Visualization

A. Identification of Potential Fraud

Visualization of correlated transactions allows for easy detection of transaction orders that are related to other fraudulent transaction orders. If visualization shows a visual mapping of one or more transactions that are connected to a rejected transaction, the one or more transactions may be identified as potentially fraudulent. On the other hand, if the visualization shows a visual mapping of one or more transactions that are connected to an accepted transaction, the one or more transaction may be identified as not potentially fraudulent. Searching transaction orders based on certain parameters and visualizing the data set from the results of the search helps make identification of potential fraud quicker and easier by narrowing analysis of transaction orders that may have similar characteristics.

Additionally, visualization can be utilized to identify potentially fraudulent transaction based on certain data elements and their relationships to transaction orders. Instead of narrowing a list of transactions by search parameters, a reviewer may choose a certain data element and find all transactions related to the data element. For example, if a certain payment account identifier has been confirmed to be associated with previous fraudulent transactions, a reviewer may generate a visualization based on the payment account identifier under the assumption that other transactions conducted with the payment account identifier may be potentially fraudulent. The resulting visualization may display all transaction orders associated with the payment account identifier, which can allow quick identification of such potentially fraudulent transactions. In some implementations, data elements known to be associated with fraudulent activity may be marked with a status (e.g., accepted, suspect, rejected) by an interactive process similar to how transaction orders are marked.

B. Fraud Analysis Examples

The following may cover some additional examples of fraud analysis utilizing transaction search visualization, according to embodiments of the invention. Some examples are described in reference to FIG. 2.

While transactions are typically rejected for being suspected of being fraudulent, there are some situations in which a transaction can be rejected without being marked as suspect. For example, merchants may have regulations on the amount of a product a consumer can purchase. If a merchant sets a limit of one product per consumer and a consumer attempts to purchase ten products, then the nine additional transactions may be rejected albeit not being fraudulent. Another example may arise if the distribution rights for a product are restricted to a specific location. If a consumer with an IP address located in Europe attempts to purchase a product with distribution rights only applicable in the United States, the transaction, while not necessarily fraudulent, would be rejected. Thus, while some transactions are not fraudulent and hence not marked as suspect, such transactions can still be rejected for various reasons.

In some embodiments, transactions may potentially become a chargeback. For example, if a reviewer accepts a transaction order that was actually fraudulent, the transaction order may turn into a chargeback at a later time due to the associated cardholder requesting a chargeback. In some cases, the reviewer may contact the cardholder when reviewing the transaction to confirm whether the transaction is fraudulent. If the cardholder confirms he did not conduct the transaction, then the reviewer may identify the transaction as fraudulent based on the suspicion that the transaction may turn into a chargeback if accepted. Hence, even if a transaction does not complete a chargeback process, it may still be marked as suspect and thus treated as if it were confirmed to be fraudulent, based on additional information from the cardholder.

In some embodiments, marking a transaction as suspect can affect how future transactions are analyzed during fraud analysis. After a reviewer marks a transaction as suspect, the transaction order may be tagged as being fraudulent in transaction history database 201. This data may be utilized by merchant processor computer 106 to generate fraud models. For example, the merchant processor computer 106 may generate a rule that any transaction orders correlating to the transaction marked as suspect should be marked suspect as well.

Further, the merchant processor computer 106 may take individual pieces of data of the transaction marked as suspect, including the email address, credit card, and shipping address and add them to a merchant's negative list. Thus, if a new transaction was to be associated with any data element in the merchant's negative list, the transaction may be rejects due to the merchant having a rule that rejects the new transaction. Exemplary data elements that can get added to a negative list after a transaction is marked as suspect include email address, credit card, shipping address, phone number, device fingerprint, IP address, consumer name, or any other information that can uniquely identify a transaction. It is noted that the consumer name may not be unique across transactions and may not be sufficient to accurately detect fraud. However, merchant fraud rules would take this into account.

IV. Computer System

Figure 15:
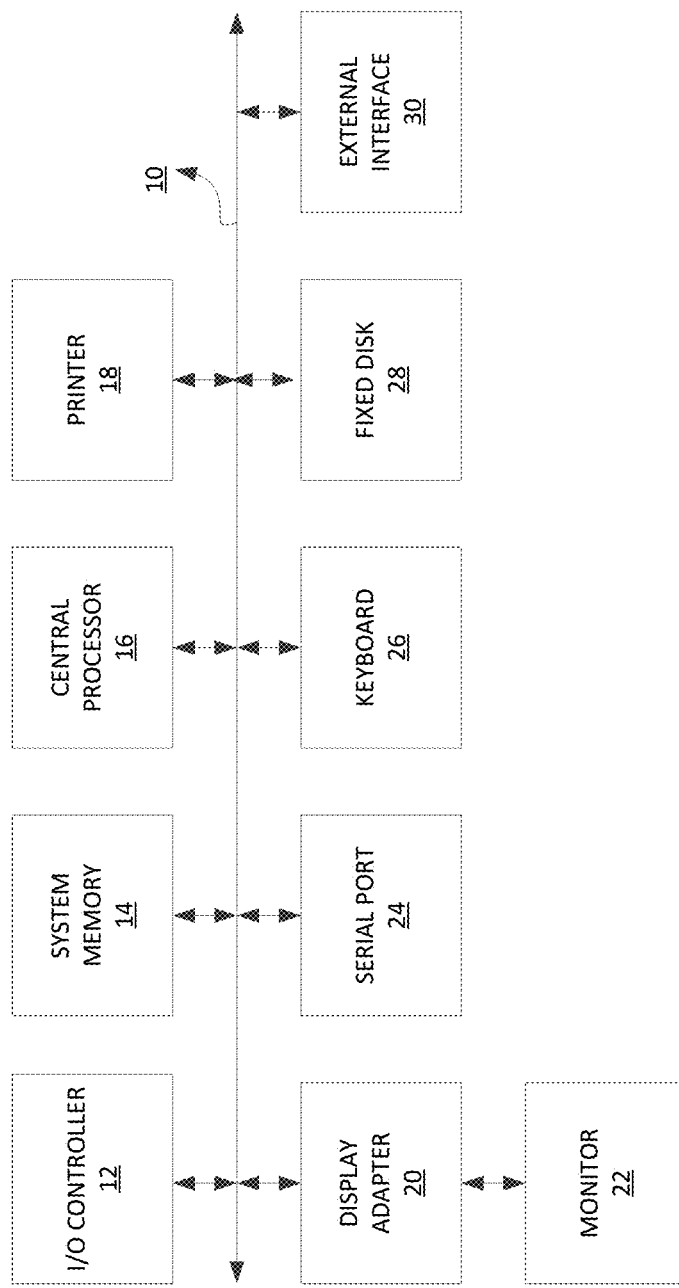
FIG. 15 illustrates a block diagram of a computer apparatus.

FIG. 15 is a high level block diagram of a computer system that may be used to implement any of the entities or components described above. The subsystems shown in FIG. 15 are interconnected via a system bus 10. Additional subsystems such as a printer 18, keyboard 26, fixed disk 28 (or other memory comprising computer readable media), monitor 22, which is coupled to display adapter 20, and others are shown. Peripherals and input/output (I/O) devices, which couple to I/O controller 12 (which can be a processor or other suitable controller), can be connected to the computer system by any number of means known in the art, such as serial port 24. For example, serial port 24 or external interface 30 can be used to connect the computer apparatus to a wide area network such as the Internet, a mouse input device, or a scanner. The interconnection via system bus allows the central processor 16 to communicate with each subsystem and to control the execution of instructions from system memory 14 or the fixed disk 28, as well as the exchange of information between subsystems. The system memory 14 and/or the fixed disk 28 may embody a computer readable medium. In some embodiments, the monitor 22 may be a touch sensitive display screen.

A computer system can include a plurality of the same components or subsystems, e.g., connected together by external interface 30 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, at a computer system, a request for visualization of a plurality of transaction orders;
   obtaining, by the computer system, transaction data associated with the plurality of transaction orders from a database communicatively coupled to the computer system, each transaction order composed of data elements;
   determining, by the computer system, a set of the transaction orders in the plurality of transaction orders as being correlated based on one or more common data elements in the transaction data associated with the set of the transaction orders;
   displaying, by the computer system on a display screen, data objects that correspond to the set of transaction orders and data objects that correspond to the one or more common data elements;
   displaying, by the computer system on the display screen, the set of the transaction orders as being correlated by showing visual connections between the data objects that correspond to the set of transaction orders and the data objects that correspond to the one or more common data elements;
   receiving, via a pointing device on the display screen, a selection of one or more of the data objects that correspond to the set of transaction orders in the plurality of transaction orders;
   providing, by the computer system, a menu with a plurality of options for the transaction orders corresponding to the selected one or more data objects;
   receiving, by the computer system, a selection of an option from the plurality of options; and
   initiating, by the computer system, an action associated with the transaction orders corresponding to the selected one or more data objects based on the selection of the option.

2. The method of claim 1, wherein the one or more common data elements include an email, a shipping address, an account identifier, a biometric identifier and an IP address.

3. The method of claim 1, wherein the plurality of options includes any two or more of: open case, reject, accept, and mark as suspect.

4. The method of claim 1, wherein the plurality of options corresponds to actions for processing the transaction orders corresponding to the selected one or more data objects.

5. The method of claim 3, further comprising:
   generating a dialog box prompting for confirmation to reject the transaction orders corresponding to the selected one or more data objects in response to the selection of the reject option.

6. The method of claim 5, further comprising:
   prompting for a reason for the selection of the reject option in the dialog box.

7. The method of claim 5, wherein the dialog box comprises a mark as suspect option.

8. The method of claim 1, further comprising:
assigning, by the computer system, a status flag to the transaction orders corresponding to the selected one or more data objects based on the selection of the option.

9. The method of claim 8, further comprising:
displaying the transaction orders corresponding to the selected one or more data objects with status icons corresponding to the assigned status flag.

10. The method of claim 9, wherein the status icons comprise a checkmark for an accept status flag, a cross for a reject status flag, and an exclamation point for a suspect status flag.

11. The method of claim 1, further comprising:
receiving a selection of a layout format; and
displaying, by the computer on the display screen, the set of the transaction orders as being correlated in the selected layout format.

12. A computer system comprising:
a processor;
a display screen;
a database storing transaction data associated with a plurality of transaction orders, each transaction order composed of data elements; and
a computer readable medium coupled to the processor, the computer readable medium comprising code executable by the processor for implementing a method comprising:
receiving a request for visualization of the plurality of transaction orders;
obtaining transaction data associated with the plurality of transaction orders from the database;
determining a set of the transaction orders in the plurality of transaction orders as being correlated based on one or more common data elements in the transaction data associated with the set of the transaction orders;
displaying, on the display screen, data objects that correspond to the set of transaction orders and data objects that correspond to the one or more common data elements;
displaying, on the display screen, the set of the transaction orders as being correlated by showing visual connections between the data objects that correspond to the set of transaction orders and the data objects that correspond to the one or more common data elements;
receiving, via a pointing device on the display screen, a selection of one or more of the data objects that correspond to the set of transaction orders in the plurality of transaction orders;
providing a menu with a plurality of options for the transaction orders corresponding to the selected one or more data objects;
receiving a selection of an option from the plurality of options; and
initiating an action associated with the transaction orders corresponding to the selected one or more data objects based on the selection of the option.

13. The computer system of claim 12, wherein the one or more common data elements include an email, a shipping address, an account identifier, a biometric identifier and an IP address.

14. The computer system of claim 12, wherein the plurality of options includes any two or more of: open case, reject, accept and mark as suspect.

15. The computer system of claim 12, wherein the plurality of options corresponds to actions for processing the transaction orders corresponding to the selected one or more data objects.

16. The computer system of claim 14, wherein the selection of the reject option generates a dialog box prompting for confirmation to reject the transaction orders corresponding to the selected one or more data objects.

17. The computer system of claim 16, wherein the dialog box comprises a mark as suspect option.

18. The computer system of claim 12, wherein the method further comprises:
assigning a status flag to the transaction orders corresponding to the selected one or more data objects based on the selection of the option.

19. The computer system of claim 18, wherein the method further comprises:
displaying the transaction orders corresponding to the selected one or more data objects with status icons corresponding to the assigned status flag.

20. The computer system of claim 12, wherein the method further comprises:
receiving a selection of a layout format; and
displaying, on the display screen, the set of the transaction orders as being correlated in the selected layout format.

* * * * *